United States Patent
Kim

(10) Patent No.: US 12,466,268 B2
(45) Date of Patent: Nov. 11, 2025

(54) BRAKE CONTROL APPARATUS AND METHOD OF VEHICLE

(71) Applicant: HYUNDAI MOBIS Co., Ltd., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 448 days.

(21) Appl. No.: 17/850,159

(22) Filed: Jun. 27, 2022

(65) Prior Publication Data

US 2023/0138862 A1 May 4, 2023

(30) Foreign Application Priority Data

Nov. 2, 2021 (KR) .......................... 10-2021-0148704

(51) Int. Cl.
*B60L 7/26* (2006.01)
*B60L 15/20* (2006.01)

(52) U.S. Cl.
CPC .............. *B60L 7/26* (2013.01); *B60L 15/2009* (2013.01); *B60L 2240/423* (2013.01); *B60L 2240/465* (2013.01); *B60L 2250/26* (2013.01)

(58) Field of Classification Search
CPC .. B60L 7/26; B60L 15/2009; B60L 2240/423; B60L 2240/465; B60L 2250/26; B60L 3/108; B60T 8/1761; B60T 7/042; B60T 8/171; B60T 8/172; B60T 13/74; B60T 2270/413; B60T 2270/60; B60K 26/02; B60Y 2304/05; B60Y 2400/301; B60Y 2400/3032

See application file for complete search history.

(56) References Cited

U.S. PATENT DOCUMENTS

| | | | | |
|---|---|---|---|---|
| 4,199,711 A | * | 4/1980 | Horiuchi | B60L 15/08 318/457 |
| 2004/0104618 A1 | * | 6/2004 | Yamamoto | B60T 7/042 303/20 |
| 2004/0238244 A1 | * | 12/2004 | Amanuma | B60L 7/26 903/917 |
| 2009/0321156 A1 | * | 12/2009 | Perkins | B60K 6/26 903/910 |
| 2012/0133202 A1 | * | 5/2012 | Mui | B60L 3/10 303/152 |

(Continued)

FOREIGN PATENT DOCUMENTS

| | | | |
|---|---|---|---|
| JP | H07163007 | * | 6/1995 |
| KR | 10-1294126 B1 | | 8/2013 |

*Primary Examiner* — Ramya P Burgess
(74) *Attorney, Agent, or Firm* — Morgan, Lewis & Bockius LLP

(57) ABSTRACT

A brake control apparatus of a vehicle may include: a front wheel braking unit implemented as an EMB (Electro Mechanical Brake) and configured to perform friction braking; a rear wheel braking unit implemented as a driving motor, and configured to perform regenerative braking or plugging braking; and a control unit configured to control the rear wheel braking unit to perform the plugging braking by switching the rear wheel braking unit to location-based control, when a vehicle is stopped by a brake operation, and to control the front wheel braking unit and the rear wheel braking unit by adjusting a braking distribution ratio of a front wheel to a rear wheel depending on whether the stopped vehicle slips.

16 Claims, 6 Drawing Sheets

(56) References Cited

U.S. PATENT DOCUMENTS

| | | | |
|---|---|---|---|
| 2013/0076113 A1* | 3/2013 | Pihl | B60W 20/14 303/3 |
| 2013/0142545 A1* | 6/2013 | Kimura | G03G 15/757 399/167 |
| 2020/0016983 A1* | 1/2020 | Kim | B60T 13/662 |
| 2020/0189398 A1* | 6/2020 | Suzuki | B60T 8/1766 |
| 2020/0398804 A1* | 12/2020 | Kobayashi | B60T 8/171 |

* cited by examiner

BRAKE CONTROL APPARATUS AND METHOD OF VEHICLE

CROSS-REFERENCE TO RELATED APPLICATION

This application claims priority from and the benefit of Korean Patent Application No. 10-2021-0148704, filed on Nov. 2, 2021, which is hereby incorporated by reference for all purposes as if set forth herein.

BACKGROUND

Field

Exemplary embodiments of the present disclosure relate to a brake control apparatus and method of a vehicle, and more particularly, to a brake control apparatus and method of a vehicle, in which an EMB (Electro Mechanical Brake) is applied to each front wheel of a vehicle and a driving motor is applied to each rear wheel of the vehicle, in order to reduce the manufacturing cost of the vehicle.

Discussion of the Background

In general, EMB refers to a brake system from which all hydraulic lines of an existing vehicle are removed, and which controls all braking operations through an electric and electronic device.

In other words, the EMB performs a braking operation by converting a driver's brake pedal force into an electrical signal to brake the vehicle, instead of a hydraulic brake system which was applied to the vehicle. For example, the EMB is a system in which, when the driver steps on the brake pedal, a simulator attached to the brake pedal converts the pedal force into an electrical signal, and transfers the electrical signal to an ECU (Electronic Control Unit), and the ECU determines a vehicle state and calculates a brake force in order to control an electric caliper.

Therefore, the EMB performs integrated control on the existing ABS, TCS, BAS, and ESC (Electronic Stability Control) functions, and can control the posture of the vehicle in any situations. When the EMB is applied to a vehicle, the vehicle does not need a plurality of parts among parts of an existing hydraulic line, such as a master cylinder and booster. Thus, the number of brake-related parts is significantly reduced. As a result, the structure of the brake system is simplified to significantly increase the flexibility in design of the vehicle.

Furthermore, since the EMB does not require the time during which hydraulic pressure is transferred, and can actively control the vehicle brake force, the EMB has a shorter braking distance than the existing brake system. As the braking distance is shortened, the stability of a driver may be further improved, and the use of the brake pedal may be further facilitated through electronic braking, while vibration is not generated.

However, the EMB requires an EMB actuator and an ECU for each wheel. Such a requirement serves as a main factor to raise the manufacturing cost of the vehicle.

Therefore, there is a need for the development of a technology capable of reducing the manufacturing cost of the vehicle by applying the EMB to an electric motor vehicle.

The related art of the present disclosure is disclosed in Korean Patent No. 10-1294126 registered on Aug. 1, 2013 and entitled "Regenerative Braking System."

SUMMARY

Various embodiments are directed to a brake control apparatus and method of a vehicle, in which an EMB is applied to each front wheel of a vehicle and a driving motor is applied to each rear wheel of the vehicle, in order to reduce the manufacturing cost of the vehicle.

The problems to be solved by the present disclosure are not limited to the above-mentioned problems, and the other unmentioned problems will be clearly understood from the following description by those skilled in the art.

In an embodiment, a brake control apparatus of a vehicle may include: a front wheel braking unit implemented as an EMB (Electro Mechanical Brake) and configured to perform friction braking; a rear wheel braking unit implemented as a driving motor, and configured to perform regenerative braking or plugging braking; and a control unit configured to control the rear wheel braking unit to perform the plugging braking by switching the rear wheel braking unit to location-based control, when a vehicle is stopped by a brake operation, and to control the front wheel braking unit and the rear wheel braking unit by adjusting a braking distribution ratio of a front wheel to a rear wheel depending on whether the stopped vehicle slips.

The control unit may transmit, to the front wheel braking unit and the rear wheel braking unit, a demand based on a basic braking distribution ratio preset for the front wheel and the rear wheel, when the vehicle is stopped, and then increase a plugging braking amount of the rear wheel braking unit to maintain the location where the vehicle is stopped, when a slip of the vehicle is sensed.

The basic braking distribution ratio may be set so that the plugging braking by the rear wheel braking unit is not performed, but only friction braking by the front wheel braking unit is performed.

The control unit may monitor current consumption by the plugging braking of the rear wheel braking unit, estimate braking torque on the basis of the current consumption, decide a braking amount of the rear wheel braking unit on the basis of the braking torque, and transmit, to the front wheel braking unit, a demand for reducing a friction braking amount of the front wheel braking unit as much as the decided braking amount.

The control unit may reduce the friction braking amount of the front wheel braking unit, such that the friction braking amount does not become equal to or less than a required front wheel braking amount based on a preset braking distribution ratio during driving.

When receiving a driving command from an accelerator pedal and a braking command from a brake pedal at the same time, the control unit may compare the driving torque magnitude of the driving command and the braking torque magnitude of the braking command, decide final driving torque or final braking torque according to the comparison result, and control the front wheel braking unit and the rear wheel braking unit according to the decided final driving torque or final braking torque.

The control unit may sense a slip of the vehicle through a wheel speed sensor which is installed on each of the front and rear wheels and configured to sense wheel speed or a location sensor which is installed on the rear wheel braking unit.

The control unit may control the rear wheel braking unit to perform regenerative braking, when the brake operation is started, and switch the rear wheel braking unit to perform plugging braking, when the vehicle speed becomes equal to or lower than a preset critical speed.

The control unit may compensate for braking torque by the regenerative braking of the rear wheel braking unit with the braking torque of the front wheel braking unit in a period where the regenerative braking is switched from the regenerative braking to the plugging braking.

The control unit may be dualized to perform a redundancy function.

In an embodiment, a brake control method of a vehicle may include: stopping, by a control unit, a vehicle by applying a friction braking force to a front wheel braking unit and applying a regenerative braking force to a rear wheel braking unit, when receiving a braking command from a pedal sensor unit; and controlling, by the control unit, the rear wheel braking unit to perform the plugging braking by switching the rear wheel braking unit to location-based control, when the vehicle is stopped.

The brake control method may further include increasing, by the control unit, a plugging braking amount of the rear wheel braking unit, in order to maintain the location where the vehicle is stopped, when a slip of the vehicle is sensed.

In the increasing of the plugging braking amount of the rear wheel braking unit, the control unit may monitor current consumption by the plugging braking of the rear wheel braking unit, estimate braking torque on the basis of the current consumption, decide a braking amount of the rear wheel braking unit on the basis of the braking torque, and transmit, to the front wheel braking unit, a demand for reducing a friction braking amount of the front wheel braking unit as much as the decided braking amount.

In the increasing of the plugging braking amount of the rear wheel braking unit, the control unit may reduce the friction braking amount of the front wheel braking unit, such that the friction braking amount does not become equal to or less than a required front wheel braking amount based on a preset braking distribution ratio during driving.

In the controlling of the rear wheel braking unit to perform the plugging braking, the control unit may transmit, to the front wheel braking unit and the rear wheel braking unit, a demand based on a basic braking distribution ratio preset for the front wheel and the rear wheel, when the vehicle is stopped.

The basic braking distribution ratio may be set so that the plugging braking by the rear wheel braking unit is not performed, but only friction braking by the front wheel braking unit is performed.

In the brake control apparatus and method of a vehicle in accordance with the embodiments of the present disclosure, the EMB may be applied to the front wheel of the vehicle, and the driving motor may be applied to the rear wheel of the vehicle, which makes it possible to reduce the manufacturing cost.

DETAILED DESCRIPTION OF THE ILLUSTRATED

Embodiments

Figure 1:
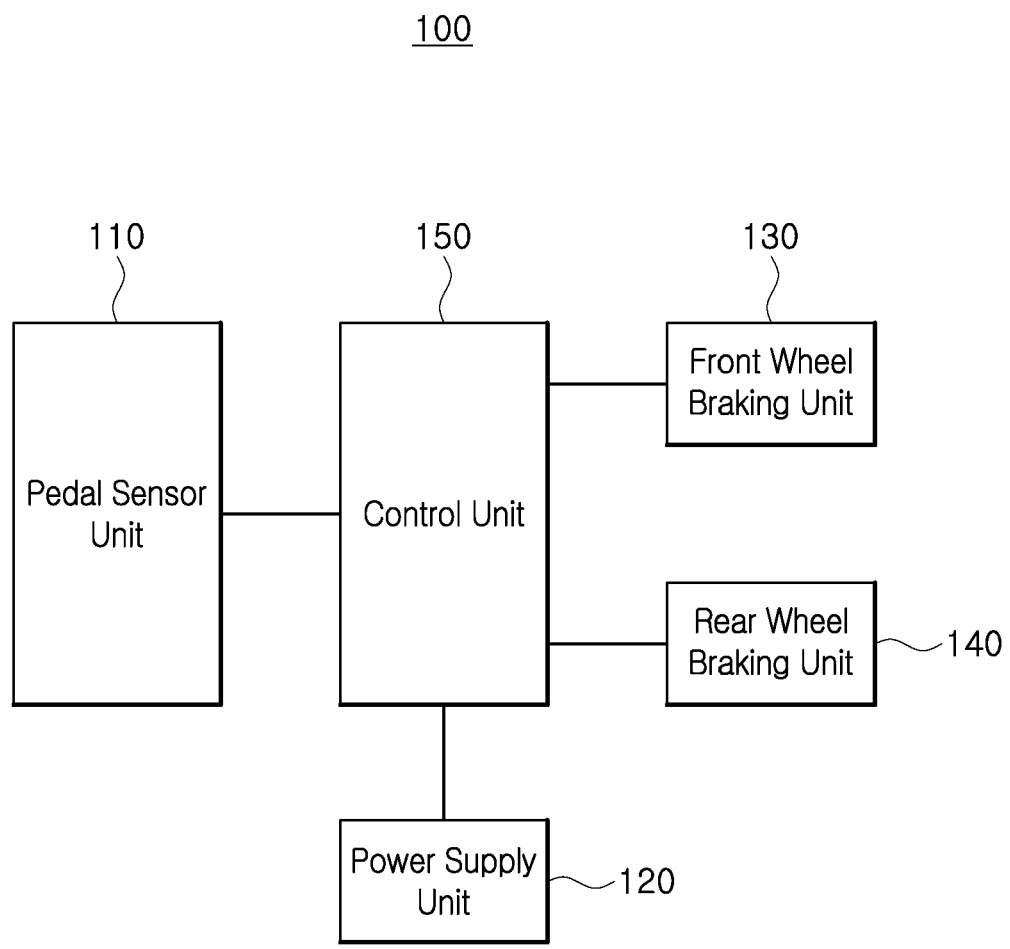
FIGS. 1 and 2 are diagrams for describing a brake control apparatus of a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a brake control apparatus and method of a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Figure 2:
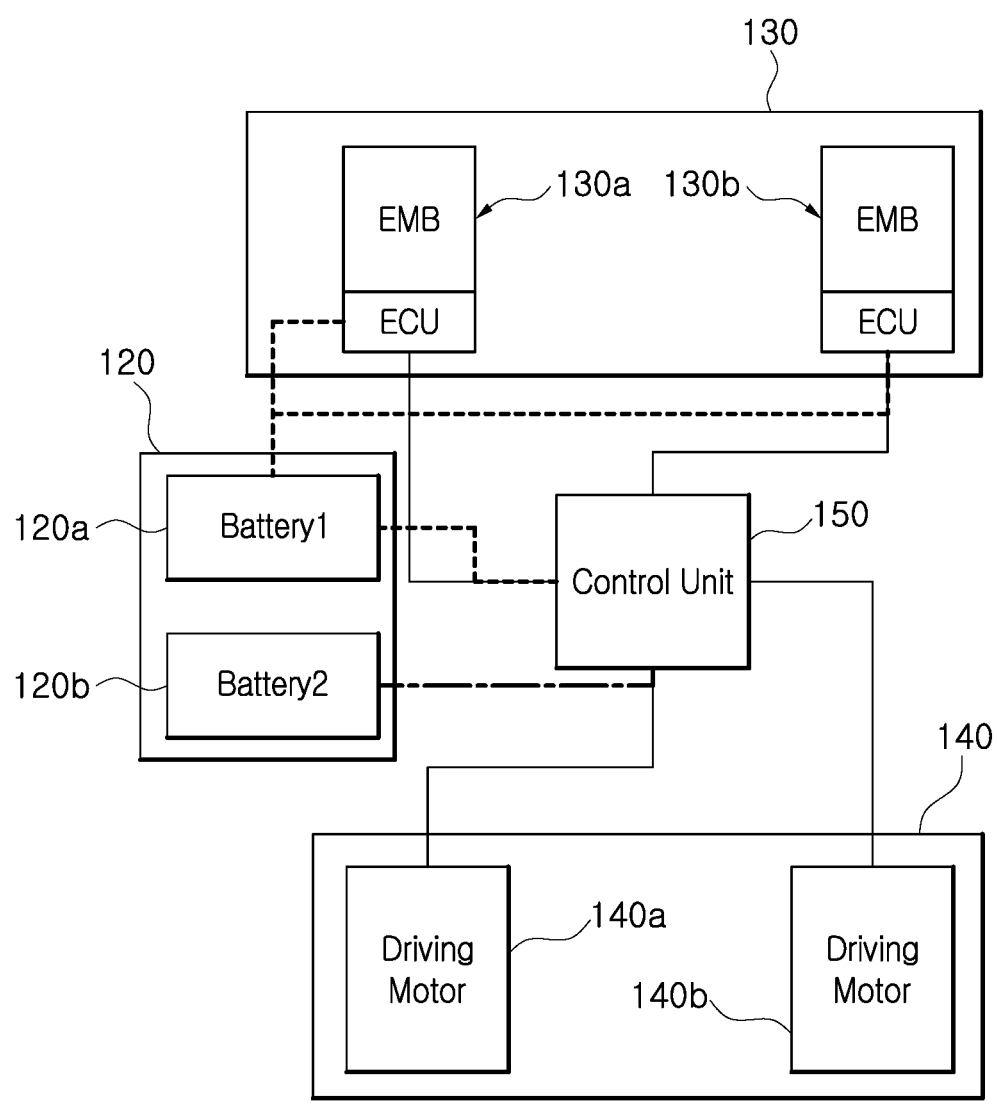
Figure 3A:
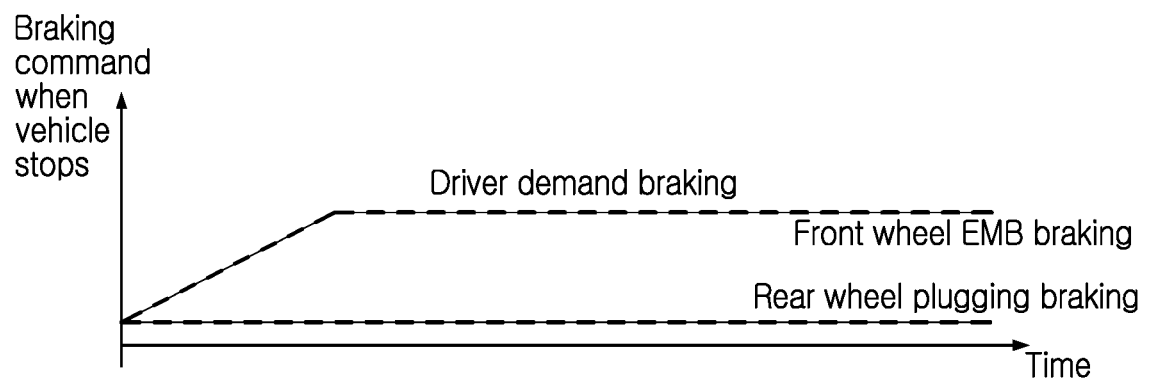
FIGS. 3A and 3B are graphs for describing braking operations for front and rear wheels according to a driver's braking request on a slope way in accordance with the embodiment of the present disclosure.
Figure 3B:
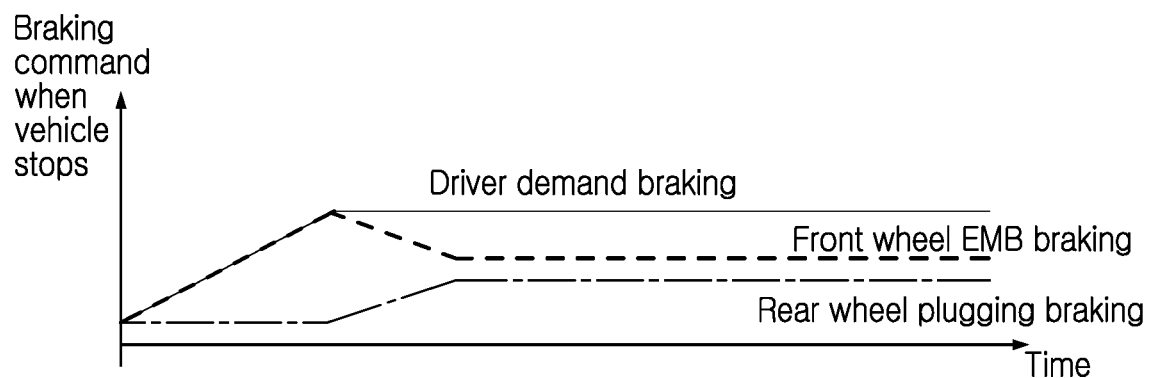
Figure 4:
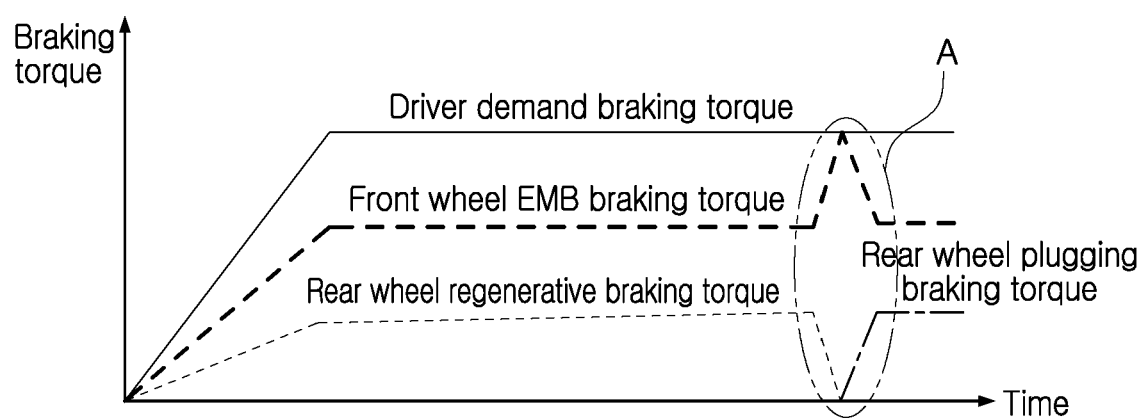
FIG. 4 is a graph for describing a braking operation during driving of the vehicle in accordance with the embodiment of the present disclosure.

FIGS. 1 and 2 are diagrams for describing a brake control apparatus of a vehicle in accordance with an embodiment of the present disclosure, FIGS. 3A and 3B are graphs for describing braking operations for front and rear wheels according to a driver's braking request on a slope way in accordance with the embodiment of the present disclosure, and FIG. 4 is a graph for describing a braking operation during driving of the vehicle in accordance with the embodiment of the present disclosure.

Referring to FIGS. 1 and 2, a brake control apparatus 100 of a vehicle in accordance with the embodiment of the present disclosure includes a pedal sensor unit 110, a power supply unit 120, a front wheel braking unit 130, a rear wheel braking unit 140, and a control unit 150.

The pedal sensor unit 110 may sense a driver's manipulation on an accelerator pedal or brake pedal. When the accelerator pedal is manipulated by the driver, the pedal sensor unit 110 may transmit a driving command to the control unit 150. Furthermore, when the brake pedal is manipulated by the driver, the pedal sensor unit 110 may transmit a braking command to the control unit 150.

The power supply unit 120 may supply power to the pedal sensor unit 110, the front wheel braking unit 130, the rear wheel braking unit 140, and the control unit 150.

The power required for the front wheel braking unit 130 may be provided by a low voltage battery of 12 to 14 V, and the power required for the rear wheel braking unit 140 may be provided by a high voltage battery of the vehicle. Thus, the power supply unit 120 may be dualized into a first power supply unit 120a configured as the low voltage battery and a second power supply unit 120b configured as the high voltage battery.

The front wheel braking unit 130 may be implemented as an EMB (Electro-Mechanical Brake) to perform friction braking, and include a left front wheel braking unit 130a and a right front wheel braking unit 130b.

The left front wheel braking unit 130a may apply a friction braking force to the left front wheel of the vehicle. The right front wheel braking unit 130b may apply a friction braking force to the right front wheel of the vehicle.

The left front wheel braking unit 130a and the right front wheel braking unit 130b may be implemented as EMB actuators which can independently brake the left front wheel and the right front wheel, respectively. As illustrated in FIG. 2, the left front wheel braking unit 130a and the right front wheel braking unit 130b may each include an ECU and an EMB actuator. The EMB actuator may operate a caliper (not illustrated) having a motor (not illustrated) mounted thereon, and apply a friction braking force to the corresponding wheel. The EMB actuator improves the dynamic behavior, braking performance and responsiveness of the vehicle, compared to an existing hydraulic disk brake. Furthermore, the EMB actuator performs vehicle speed control more accurately than the existing hydraulic disk brake. In this case, various actuators provided for the EMB may be all employed as the EMB actuator. The ECU may control the EMB actuator according to a control signal inputted from the control unit 150. The EMB actuator and the ECU may be separately installed. However, the present disclosure is not limited thereto, but the EMB actuator and the ECU may be integrated with each other.

The front wheel braking unit 130 may be connected to the power supply unit 120 and operated by the power of the power supply unit 120. At this time, as illustrated in FIG. 2, the front wheel braking unit 130 may receive power from the first power supply unit 120a.

The rear wheel braking unit 140 may be implemented as a driving motor to perform regenerative braking or plugging braking, and include a left rear wheel braking unit 140a and a right rear wheel braking unit 140b. The driving motor may be an in-wheel motor or not, and any motors which can each independently drive the corresponding wheel may be all employed as the driving motor.

The left rear wheel braking unit 140a may apply a regenerative braking force or plugging braking force to the left rear wheel of the vehicle. The right rear wheel braking unit 140b may apply a regenerative braking force or plugging braking force to the right rear wheel of the vehicle. The plugging braking is a different concept from the regenerative braking during which the high voltage battery is charged while a braking force is generated, and refers to an operation of braking the vehicle by applying a back driving current to the driving motor in order to only generate a braking force without charging the battery. Considering the specification of the current driving motor, it is difficult to deal with the front wheel braking through the capacity of the plugging braking by the driving motor, but it is possible to generate a braking force for the rear wheel, which is not as high as a required braking force for the front wheel. Therefore, the rear wheel braking unit 140 may be implemented as a driving motor.

The rear wheel braking unit 140 may be connected to the power supply unit 120 and operated by the power of the power supply unit 120. At this time, as illustrated in FIG. 2, the rear wheel braking unit 140 may receive power from the second power supply unit 120b.

The control unit 150 may control the front wheel braking unit 130 and the rear wheel braking unit 140 according to a command from the pedal sensor unit 110. Specifically, when receiving a braking command from the pedal sensor unit 110, the control unit 150 may control the front wheel braking unit 130 and the rear wheel braking unit 140 to be driven according to a braking distribution ratio. The braking distribution ratio may refer to the ratio of braking forces applied to the front wheel and the rear wheel of the vehicle, respectively.

The control unit 150 may sense a stroke (or displacement) of the brake pedal, and independently control the front wheel braking unit 130 and the rear wheel braking unit 140 on the basis of the stroke (or displacement) of the brake pedal. At this time, the control unit 150 may apply a friction braking force to the front wheel braking unit 130, and apply a regenerative braking force or plugging braking force to the rear wheel braking unit 140.

When receiving a braking command from the pedal sensor unit 110, the control unit 150 may apply a friction braking force to the front wheel braking unit 130, and apply a regenerative braking force to the rear wheel braking unit 140, in order to stop the vehicle. When the vehicle is stopped, the control unit 150 may switch the rear wheel braking unit 140 to location-based control, and control the rear wheel braking unit 140 to perform plugging braking.

A representative example of the case in which the plugging braking is required during the braking process by the rear wheel braking unit 140 may include the case in which braking is performed under a static condition. The regenerative braking has a mechanism in which the driving motor is switched to a generator for a wheel which is already rotating, and generates braking torque while charging a battery. Thus, during the regenerative braking, a moving state may be changed to a stopped state, but it is difficult to continuously maintain the stopped state. When only the magnitude of a braking force required for continuously maintaining the stopped state is considered, the braking force may be sufficiently covered by only the front wheel friction braking. However, when the front wheels of the vehicle are located on a slope way or a low friction road such as an icy road, the rear wheel braking is needed, if necessary. Therefore, the plugging braking is necessarily required. However, when the number of times that the plugging braking is used and the time required for the plugging braking are increased, a heating value is increased, and thus needs to be minimized.

Thus, when the vehicle is stopped by the driver's manipulation on the brake pedal, the control unit 150 may switch the rear wheel braking unit 140 to location-based control, and control the rear wheel braking unit 140 to perform plugging braking. Depending on whether the stopped vehicle slips, the control unit 150 may adjust the braking distribution ratio of the front wheel to the rear wheel, and control the front wheel braking unit 130 and the rear wheel braking unit 140.

Specifically, when the vehicle is stopped by the brake operation, the control unit 150 may switch the rear wheel braking unit 140 to location-based control, and control the rear wheel braking unit 140 to perform plugging braking. Then, the control unit 150 may transmit, to the front wheel braking unit 130 and the rear wheel braking unit 140, a demand based on a basic braking distribution ratio preset for the front wheel and the rear wheel. The basic braking distribution ratio indicates a braking distribution ratio set for the front wheel and the rear wheel, when the vehicle is stopped. For example, the basic braking distribution ratio may be set to 10:0. When the braking distribution ratio of the front wheel to the rear wheel is 10:0, the rear wheel braking unit 140 does not perform plugging braking, which makes it possible to minimize the current consumption or heat generation.

When a slip of the vehicle is sensed while the front wheel braking unit 130 and the rear wheel braking unit 140 are controlled according to the basic braking distribution ratio, the control unit 150 may increase the plugging braking amount of the rear wheel braking unit 140 in order to maintain the location where the vehicle is stopped. At this time, the control unit 150 may sense the slip of the vehicle through a wheel speed sensor (not illustrated) which is installed on each of the front and rear wheels and configured to sense wheel speed or a location sensor (not illustrated) which is installed on the rear wheel braking unit 140.

When the front wheels are located on a low friction road such as an icy road and the vehicle is located on a slope way, the vehicle may slip. When the slip of the vehicle is sensed, it is difficult for the control unit 150 to brake the vehicle only with the front wheel braking unit 130. Thus, the control unit 150 may use the plugging braking of the rear wheel braking unit 140. That is, when the vehicle starts to slip, the control unit 150 may increase the plugging braking amount while increasing the amount of current used for the rear wheel braking unit 140 which performs location-based control, in order to maintain the location where the vehicle is stopped.

For example, the control unit 150 may increase the plugging braking amount of the rear wheel braking unit 140 while sequentially changing the braking distribution ratio of the front wheel to the rear wheel from 10:0 to 9:1, 8:2 . . . .

Although the rear wheel braking unit 140 is switched to the location-based control, a slip of the vehicle may be sensed because the front wheels of the stopped vehicle are not located on a low friction road such as an icy road. In this case, the control unit 150 may increase the braking distribution ratio of the rear wheel braking unit 140. At this time, the control unit 150 may monitor the current consumption by the plugging braking of the rear wheel braking unit 140, and reduce the demand for the front wheel friction braking as much as a braking amount corresponding to the increasing current, in order to efficiently utilize energy.

Specifically, the control unit 150 may monitor the current consumption by the plugging braking of the rear wheel braking unit 140, estimate braking torque on the basis of the current consumption, decide the braking amount of the rear wheel braking unit 140 on the basis of the braking torque, and transmit, to the front wheel braking unit 130, a demand for reducing the friction braking amount of the front wheel braking unit 130 as much as the decided braking amount. At this time, the control unit 150 may reduce the friction braking amount of the front wheel braking unit 130, such that the friction braking amount does not become equal to or less than a required front wheel braking amount based on the preset braking distribution ratio during driving. That is, the control unit 150 may reduce the demand for the front wheel friction braking, such that the friction braking amount does not become equal to or less than the required front wheel braking amount based on the braking distribution ratio of the front wheel to the rear wheel during normal driving, which is set by a basic braking design value.

For example, when the front wheels are not located on a low fiction road, the control unit 150 may apply a friction braking force to the front wheel braking unit 130 according to driver demand braking as illustrated in FIG. 3A, in order to stop the vehicle. At this time, the plugging braking of the rear wheel braking unit 140 is not performed. When the front wheels are located on a low friction road in a slope way, the control unit 150 may apply the friction braking force to the front wheel braking unit 130 and the plugging braking force to the rear wheel braking unit 140 according to the driver demand braking, as illustrated in FIG. 3B. At this time, when the required front wheel braking amount is set to 70% of the entire required braking amount, the control unit 150 may control the plugging braking amount of the rear wheel braking unit 140 such that the plugging braking amount does not become equal to or less than 30% of the entire required braking amount.

Furthermore, when receiving a driving command from the accelerator pedal and a braking command from the brake pedal at the same time, the control unit 150 may compare the driving torque magnitude of the driving command and the braking torque magnitude of the braking command, decide final driving torque or final braking torque according to the comparison result, and control the front wheel braking unit 130 and the rear wheel braking unit 140 according to the decided final driving torque or final braking torque. That is, when receiving the driving command and the braking command at the same time, the control unit 150 may synthetically determine the driving command transferred from the accelerator pedal and the braking command transferred from the brake pedal, in order to decide the final driving torque or the final braking torque.

When receiving an acceleration command and the braking command at the same time, the control unit 150 may not decide demands to perform the acceleration command and the braking command, respectively, but decide a final command on the basis of the torque of the driving command and the torque of the braking command. That is, the control unit 150 may compare the torque magnitude of the driving command and the torque magnitude of the braking command, and decide, as the final command, the command whose torque magnitude is larger, according to the comparison result.

For example, the control unit 150 may decide the direction and magnitude of the final generated torque in which the driving command and the braking command are added as plus torque and minus torque, respectively, and perform control for minimizing unnecessary current consumption.

The control unit 150 may directly control the rear wheel braking unit 140 according to the received command or decided final command, and transmit a necessary demand to the front wheel braking unit 130.

The control unit 150 may transfer a demand corresponding to the received command or decided final command to the front wheel braking unit 130 and the rear wheel braking unit 140. That is, the control unit 150 may transfer a driving signal to the front wheel braking unit 130 and the rear wheel braking unit 140, such that the front wheel braking unit 130 and the rear wheel braking unit 140 are driven according to the braking distribution ratio. The braking distribution ratio refers to the ratio of braking forces applied to the front wheel and the rear wheel of the vehicle, respectively.

The control unit 150 may change the braking distribution ratio, and transmit a demand, corresponding to the changed braking distribution ratio, to the front wheel braking unit 130 and the rear wheel braking unit 140.

Furthermore, the control unit 150 may control the rear wheel braking unit 140 to perform regenerative braking, when the brake operation starts, and switch the rear wheel braking unit 140 to perform plugging braking, when the vehicle speed becomes equal to or lower than a preset critical speed. At this time, the control unit 150 may compensate for braking torque by the regenerative braking of the rear wheel braking unit 140 with the braking torque of the front wheel braking unit 130, in a period where the rear wheel braking unit 140 is switched from the regenerative braking to the plugging braking.

Although the brake operation is performed during driving, the regenerative braking of the rear wheel braking unit 140 may not be normally performed in a period where the vehicle speed becomes equal to or lower than the critical speed. Therefore, as illustrated in FIG. 4, the rear wheel braking unit 140 may switch over from the regenerative braking to the plugging braking, if necessary. In order to minimize a sense of difference during the switching, the control unit 150 may perform switching period compensation control using the front wheel braking unit 130 as indicated by A.

The control unit 150 performing the above-described operation may be dualized to perform the redundancy function.

Figure 5:
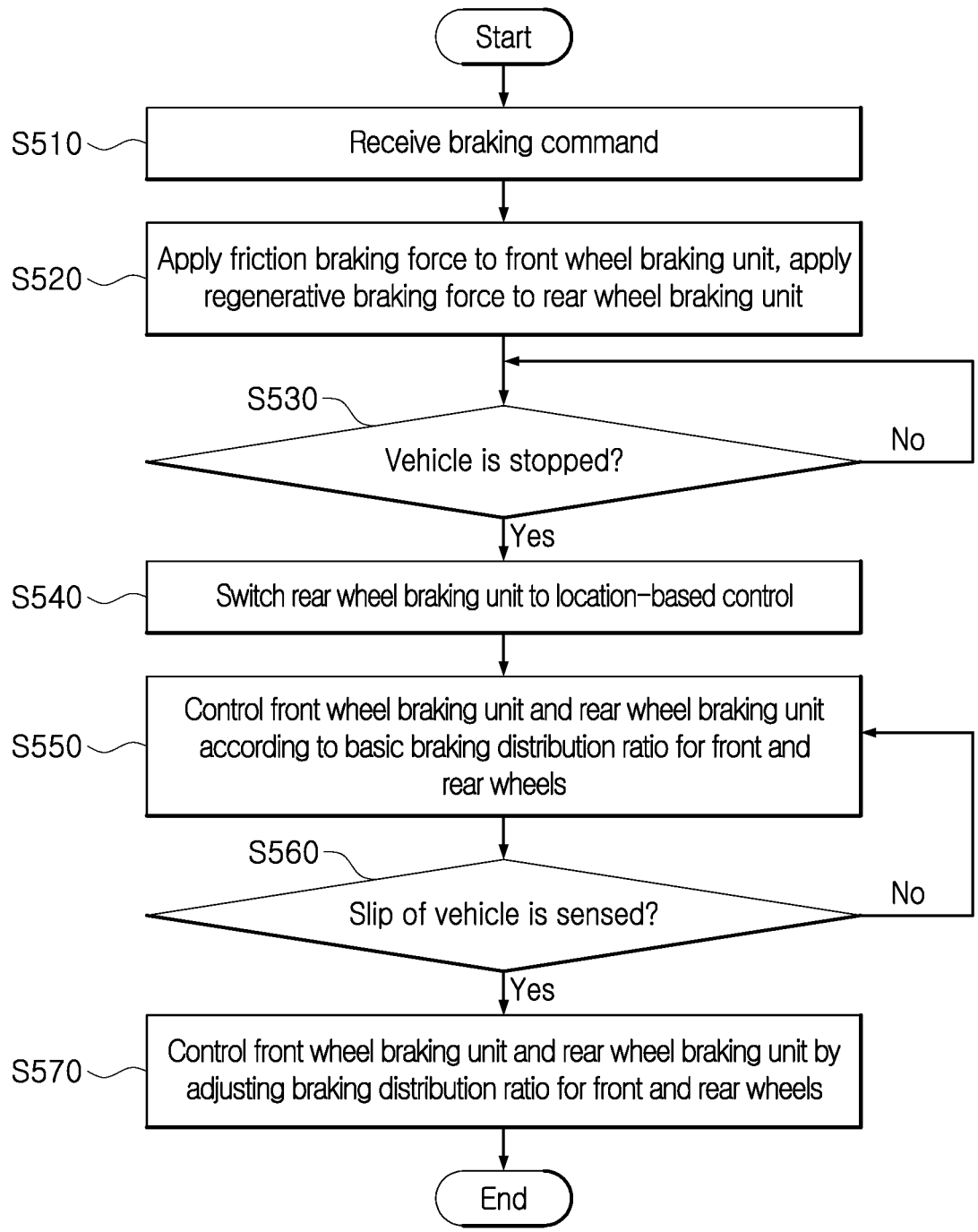
FIG. 5 is a flowchart for describing a brake control method of a vehicle in accordance with an embodiment of the present disclosure.

FIG. 5 is a flowchart for describing a brake control method of a vehicle in accordance with an embodiment of the present disclosure.

Referring to FIG. 5, when a braking command is received from the pedal sensor unit 110 in step S510, the control unit 150 may apply a friction braking force to the front wheel braking unit 130, and apply a regenerative braking force to the rear wheel braking unit 140, in order to stop the vehicle, in step S520. When a driver steps on the brake pedal to start braking, the pedal sensor unit 110 may transmit a braking command to the control unit 150. Then, the control unit 150 may apply a friction braking force to the front wheel braking unit 130, and apply a regenerative braking force to the rear wheel braking unit 140, in order to stop the vehicle.

When the vehicle is stopped in step S530 after step S520, the control unit 150 may switch the rear wheel braking unit 140 to location-based control in step S540, and control the front wheel braking unit 130 and the rear wheel braking unit 140 according to a basic braking distribution ratio preset for the rear wheel and the front wheel, in step S550. At this time, the control unit 150 may determine whether the vehicle is stopped, through the wheel speed sensor or the location sensor installed on the rear wheel braking unit 140. When the vehicle is stopped, the control unit 150 may transmit, to the front wheel braking unit 130 and the rear wheel braking unit 140, a demand based on the basic braking distribution ratio preset for the front wheel and the rear wheel. The basic braking distribution ratio may be set so that the plugging braking by the rear wheel braking unit 140 is not performed, and only the friction braking by the front wheel braking unit 130 is performed.

When a slip of the vehicle is sensed in step S560 after step S550, the control unit 150 adjusts the braking distribution ratio of the front wheel to the rear wheel and controls the front wheel braking unit 130 and the rear wheel braking unit 140, in order to maintain the location where the vehicle is stopped, in step S570. At this time, the control unit 150 may determine whether the slip of the vehicle is sensed, through the wheel speed sensor or the location sensor installed on the rear wheel braking unit 140. When the slip of the vehicle is sensed, the control unit 150 may increase the plugging braking amount of the rear wheel braking unit 140, in order to maintain the location where the vehicle is stopped. At this time, the control unit 150 may monitor the current consumption by the plugging braking of the rear wheel braking unit 140, estimate braking torque on the basis of the current consumption, decide the braking amount of the rear wheel braking unit 140 on the basis of the braking torque, and transmit, to the front wheel braking unit 130, a demand for reducing the friction braking amount of the front wheel braking unit 130 as much as the decided braking amount. At this time, the control unit 150 may reduce the friction braking amount of the front wheel braking unit 130, such that the friction braking amount does not become equal to or less than the required front wheel braking amount based on the preset braking distribution ratio during driving.

In the brake control apparatus and method of a vehicle in accordance with the embodiments of the present disclosure, the EMB may be applied to the front wheel of the vehicle, and the driving motor may be applied to the rear wheel of the vehicle, which makes it possible to reduce the manufacturing cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake control apparatus of a vehicle, comprising:
a front wheel braking unit implemented as an EMB (Electro Mechanical Brake) and configured to perform a friction braking;
a rear wheel braking unit implemented as a driving motor, and configured to perform a regenerative braking and a plugging braking; and
a control unit configured to:
determine that the vehicle slips at a location where the vehicle is stopped to a stopped state;
control the rear wheel braking unit to perform the plugging braking by switching the rear wheel braking unit to a location-based control to use the plugging braking when the vehicle is stopped to the stopped state by a brake operation; and
control the front wheel braking unit and the rear wheel braking unit by adjusting a braking distribution ratio of a front wheel to a rear wheel to maintain the location of the vehicle where the vehicle slips in the stopped state,
wherein the control unit adjusts the braking distribution ratio of the front wheel to the rear wheel by increasing an amount of the plugging braking of the rear wheel braking unit and decreasing an amount of the friction braking of the front wheel braking unit as much as the increased amount of the plugging braking of the rear wheel braking unit, to maintain the location where the vehicle slips in the stopped state.

2. The brake control apparatus of claim 1, wherein the control unit transmits, to the front wheel braking unit and the rear wheel braking unit, a demand based on a basic braking distribution ratio preset for the front wheel and the rear wheel when the vehicle is stopped to the stopped state, and then increases a plugging braking amount of the rear wheel braking unit to maintain the location of the vehicle where the vehicle slips in the stopped state.

3. The brake control apparatus of claim 2, wherein the basic braking distribution ratio is set so that the plugging braking by the rear wheel braking unit is not performed, but only the friction braking by the front wheel braking unit is performed.

4. The brake control apparatus of claim 2, wherein the control unit monitors current consumption by the plugging braking of the rear wheel braking unit, estimates a braking torque based on the current consumption, decides a braking amount of the rear wheel braking unit based on the braking torque, and transmits, to the front wheel braking unit, a demand for reducing a friction braking amount of the front wheel braking unit as much as the decided braking amount.

5. The brake control apparatus of claim 4, wherein the control unit reduces the friction braking amount of the front wheel braking unit, such that the friction braking amount does not become less than or equal to a required front wheel braking amount based on a preset braking distribution ratio during driving.

6. The brake control apparatus of claim 1, wherein when receiving a driving command from an accelerator pedal and a braking command from a brake pedal at the same time, the control unit compares a driving torque magnitude of the driving command and a braking torque magnitude of the braking command, decides a final driving torque or a final braking torque according to a comparison result, and controls the front wheel braking unit and the rear wheel braking unit according to the decided final driving torque or final braking torque.

7. The brake control apparatus of claim 1, wherein the control unit senses a slip of the vehicle through a wheel speed sensor which is installed on each of the front and rear wheels and configured to sense a wheel speed, or through a location sensor which is installed on the rear wheel braking unit.

8. The brake control apparatus of claim 1, wherein the control unit controls the rear wheel braking unit to perform the regenerative braking when the brake operation starts, and switches the rear wheel braking unit to perform the plugging braking when the vehicle speed becomes lower than or equal to a preset critical speed.

9. The brake control apparatus of claim 8, wherein the control unit compensates for a braking torque by the regenerative braking of the rear wheel braking unit with a braking torque of the front wheel braking unit in a period where the regenerative braking is switched from the regenerative braking to the plugging braking.

10. The brake control apparatus of claim 1, wherein the control unit is dualized to perform a redundancy function.

11. A brake control method of a vehicle, comprising:
stopping, by a control unit, a vehicle to a stopped state by applying a friction braking force to a front wheel braking unit and applying a regenerative braking force to a rear wheel braking unit, when receiving a braking command from a pedal sensor unit;
determining that the vehicle slips at a location where the vehicle is stopped to the stopped state; and
controlling, by the control unit, the rear wheel braking unit to perform a plugging braking by switching the rear wheel braking unit to a location-based control to use the plugging braking, when the vehicle is stopped to the stopped state,
wherein in the controlling of the rear wheel braking unit to perform the plugging braking,
the control unit adjusts a braking distribution ratio of a front wheel to a rear wheel by increasing an amount of the plugging braking of the rear wheel braking unit and decreasing an amount of the friction braking of the front wheel braking unit as much as the increased amount of the plugging braking of the rear wheel braking unit, to maintain the location where the vehicle slips in the stopped state.

12. The brake control method of claim 11, further comprising increasing, by the control unit, a plugging braking amount of the rear wheel braking unit, in order to maintain the location of the vehicle where the vehicle slips in the stopped state.

13. The brake control method of claim 12, wherein in the increasing of the plugging braking amount of the rear wheel braking unit,
the control unit monitors current consumption by the plugging braking of the rear wheel braking unit, estimates a braking torque based on the current consumption, decides a braking amount of the rear wheel braking unit based on the braking torque, and transmits, to the front wheel braking unit, a demand for reducing a friction braking amount of the front wheel braking unit as much as the decided braking amount.

14. The brake control method of claim 13, wherein in the increasing of the plugging braking amount of the rear wheel braking unit,
the control unit reduces the friction braking amount of the front wheel braking unit, such that the friction braking amount does not become less than or equal to a required front wheel braking amount based on a preset braking distribution ratio during driving.

15. The brake control method of claim 11, wherein in the controlling of the rear wheel braking unit to perform the plugging braking,
the control unit transmits, to the front wheel braking unit and the rear wheel braking unit, a demand based on a basic braking distribution ratio preset for the front wheel and the rear wheel, when the vehicle is stopped.

16. The brake control method of claim 15, wherein the basic braking distribution ratio is set so that the plugging braking by the rear wheel braking unit is not performed, but only the friction braking by the front wheel braking unit is performed.

* * * * *